United States Patent
Weber

[11] 3,923,151
[45] Dec. 2, 1975

[54] DRIVE CONTROL SYSTEM FOR AN ENDLESS CONVEYOR BELT

[75] Inventor: Karl-Heinz Weber, Witten-Heven, Germany

[73] Assignee: Gebr. Eickhoff, Maschinenfabrik und Eisengiesserei m.b.H., Bochum, Germany

[22] Filed: Oct. 23, 1973

[21] Appl. No.: 408,452

[30] Foreign Application Priority Data
Oct. 27, 1972 Germany............................ 2252709

[52] U.S. Cl. ................. 198/203; 198/110; 198/208
[51] Int. Cl.² .......................................... B65G 23/00
[58] Field of Search ........... 198/208, 232, 110, 203; 74/242.11 C, 242.14 R; 226/25, 42, 44; 242/75.51; 318/6, 398

[56] References Cited
UNITED STATES PATENTS

| | | | |
|---|---|---|---|
| 2,798,677 | 7/1957 | Nicholson.................... | 242/75.51 X |
| 3,187,243 | 6/1965 | Long............................ | 318/6 |
| 3,488,696 | 1/1970 | Klang........................... | 242/75.51 X |
| 3,497,154 | 2/1970 | Lasarev et al. .............. | 242/75.51 X |
| 3,638,781 | 2/1972 | Comley........................ | 198/208 |
| 3,670,975 | 6/1972 | Tomimatsu................... | 318/6 X |
| 3,672,600 | 6/1972 | Carlson et al................ | 318/6 X |

Primary Examiner—Evon C. Blunk
Assistant Examiner—James L. Rowland
Attorney, Agent, or Firm—Brown, Murray, Flick & Peckham

[57] ABSTRACT

A thyristor controlled power supply forms part of a control system for a drive motor to accelerate and decelerate an endless conveyor belt trained around a guide drum coupled to the drive motor. A tension drum is controllably positioned by a stepping motor to develop a predetermined tension in the conveyor belt. A firing circuit for the thyristors in the power supply lines is controlled by a regulator which receives signals corresponding to the actual tension and desired tension in the conveyor belt during acceleration and deceleration. In one form, these signals are provided by a tachometer coupled to the drive motor and a potentiometer with a motor-driven movable tap. The drive motor for the movable tap may be controlled by an integrating circuit to vary the speed of the tap during acceleration and deceleration of the belt. In a second form, the regulator receives a signal from a load sensor coupled in the drive train for the tension drum and a signal from a manually set potentiometer corresponding to the desired tensioning of the conveyor belt.

7 Claims, 3 Drawing Figures

DRIVE CONTROL SYSTEM FOR AN ENDLESS CONVEYOR BELT

BACKGROUND OF THE INVENTION

The present invention relates to a drive control system for an endless conveyor belt which is trained between spaced guide drums, one of which is driven by a motor and a tensioning drum engageable with the endless belt for maintaining a predetermined tension in the belt. Belt tensioning is provided by a stepping motor used to position the tensioning drum. More particularly, the present invention relates to providing a controlled power supply for the drive motor connected to the guide drum.

When employing endless belt conveyors, it is important that the tension in the belt should remain below a value at which the belt will tear during operation and particularly when starting and stopping the belt. Continuous operation of the conveyor can be assured by matching the speed of the driving drum to the operating conditions of the installation by means of a variable transmission connected to the drive motor so that tension stress in the conveyor belt will fall below permitted limits throughout the time when the belt is running in an unloaded state and when the belt is loaded to a greater or lesser extent by the material being conveyed. These variable conditions make it more difficult to control the belt tension stress during starting and stopping of the conveyor. Special drive equipment was used in the past to prevent overstressing the conveyor belt during the starting-up period. A squirrel-cage type motor was used along with special starting couplings connected to the drive drums for the conveyor. After the belt conveyor attained the full operating speed, a gear drive system was then used for the continuous operation of the conveyor.

SUMMARY OF THE INVENTION

It is an object of the present invention to provide a drive motor control system for starting and stopping a belt conveyor in a manner which is compatible for continuous operation of the conveyor by the same drive motor which is coupled through a gear reducer to a drive drum for the conveyor belt, the control is characterized by starting and stopping the conveyor belt without excessively loading the power supply or imposing excessively large tension stresses on the conveyor belt. This control system is particularly adapted for the special operating conditions occurring during the starting and stopping of the conveyor.

It is a still further object of the present invention to provide a control system for the starting and stopping of an endless belt conveyor wherein the rotational speed of the drive motor is controlled in such a manner that operational parameters of the conveyor system are not exceeded during the starting and stopping operations.

These features and advantages of the present invention are realized by providing a regulator for controlling the current and voltage delivered to a drive motor for an endless belt conveyor wherein the regulator functions are based on electrical signals corresponding to a desired tension in the conveyor belt and actual tension in the conveyor belt during acceleration and deceleration thereof by the drive motor.

In one form of the present invention, there is provided the combination of: an endless conveyor belt trained about a guide drum which is connected, in turn, to a drive motor, a tension drum contacting the conveyor belt, position control means connected to the tension drum for developing a predetermined desired tension in the conveyor belt, and a control system for starting and stopping the conveyor belt by the drive motor, the control system comprising means for producing an electrical signal corresponding to a desired tensioning of the conveyor belt during acceleration and deceleration by the drive motor, means for producing an electrical signal to represent the actual tensioning of the conveyor belt during acceleration and deceleration by the drive motor, and regulator means for producing an error signal corresponding to the difference between the electrical signal produced, the regulator means controlling the drive motor in response to the error signal during acceleration and deceleration to limit a development of tension stresses in the conveyor belt to a value corresponding to the desired tensioning thereof.

The regulator means are preferably used to fire thyristors in power supply lines for varying the voltage and current delivery to the drive motor, preferably of a three-phase type. The thyristors have very short switching times and are consequently particularly suitable for rapid control and thus for regulating the speed of a three-phase motor. It is, therefore, possible to adjust the torque produced by the drive motor to essentially any desired value and to control the torque in response to a suitable belt tension limit signal by stepless control of the frequency and/or output voltage of the current supplied to the drive motor. By maintaining the conveyor belt tension below a predetermined belt tension as an operating characteristic for the control, safe trouble-free starting and stopping of the conveyor belt can be effected. The permissible belt tension which is a selected required value is continuously applied in the form of a signal to the regulator for the control system. The required tension value signal is generated from a fixed voltage source. By adjusting the voltage in a continuously changing manner, it will remain proportional to the conveyor speed and the permissible conveyor belt tension which is maintained at a constant value during acceleration and deceleration.

A signal, representing the constant belt tension, is provided by a device such as a spring or load sensor, interconnecting the tension drum and the tensioning motor. When the actual belt tension is chosen as an operating parameter of the conveying system, the starting time and the stopping time of the conveyor will vary as a function of the loading on the conveyor. When belt conveyors are arranged in series and, if necessary, of different lengths, this can lead to different starting and stopping times of the separate conveyor belts and to inconvenient operations.

Controlled acceleration or deceleration of the driving drum may be matched to one operating characteristic of the entire conveyor installation which provides an operating parameter for controlling the starting and stopping operations of all of the conveyors. When selecting an acceleration or deceleration value as the operating parameter for the control system, consideration must be given to inertial forces. These forces are maximum with a maximum conveyor belt load and loading during acceleration or deceleration. The inertial forces must remain within the limits set for permissible belt tension. In this type of control system, the starting time and stopping time are constant and independent of the load carried by the conveyor belt. This type of control is particularly useful for the starting and stopping of several sequentially arranged conveyor belts which may have different lengths and where the conveyed material is discharged from one belt to the next. The same operating parameter can be used for the starting and stopping of all the conveyor belts so that the start-up times and the stopping times of the individual conveyor belts can be matched exactly to each other, thereby preventing inaccurate transfer of the conveyed material between transfer points on the individual conveyor belts. This, of course, could not be avoided when different starting and stopping times are used for the sequentially arranged conveyor belts.

To provide uniform starting times, the control includes a potentiometer having a movable tap which is displaced by a variable speed motor to provide an output signal from the potentiometer representing a required value of the operating parameter for use by the regulator device in the control system. This required value is compared in the regulator device by an actual measured operating parameter supplied by a tachometer coupled to the drive motor to give a signal proportional to the rotational speed of the motor. The motor drive for the movable tap of the potentiometer can be controlled by an integrator circuit connecting in series with the motor current supple lines. The integrator consists of, for example, a serially arranged variable resistor and capacitor so that the motor produces an acceleration of the movable tap corresponding to a required value of acceleration or deceleration of the conveyor by the drive motor.

These features and advantages of the present invention as well as others will be more readily understood when the following description is read in light of the accompanying drawings, in which.

Figure 1:
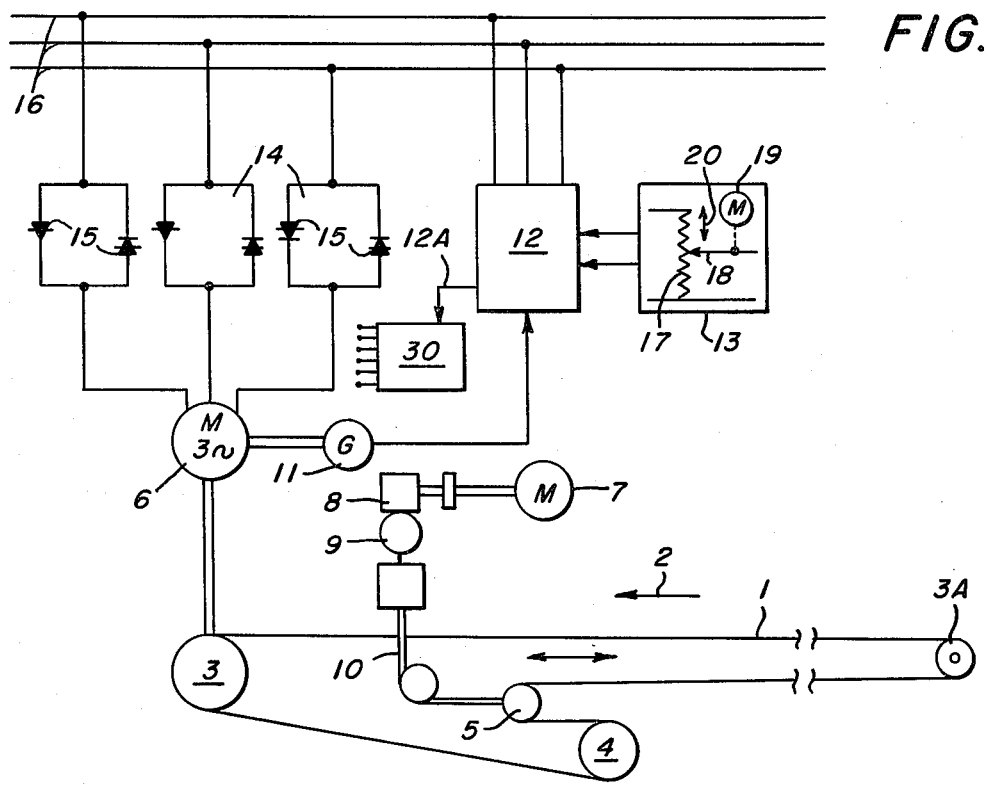
FIG. 1 is a schematic illustration of one form of the present invention wherein an endless belt conveyor is provided with a control system to operate on the basis of a constant acceleration and deceleration times for the conveyor.
Figure 2:
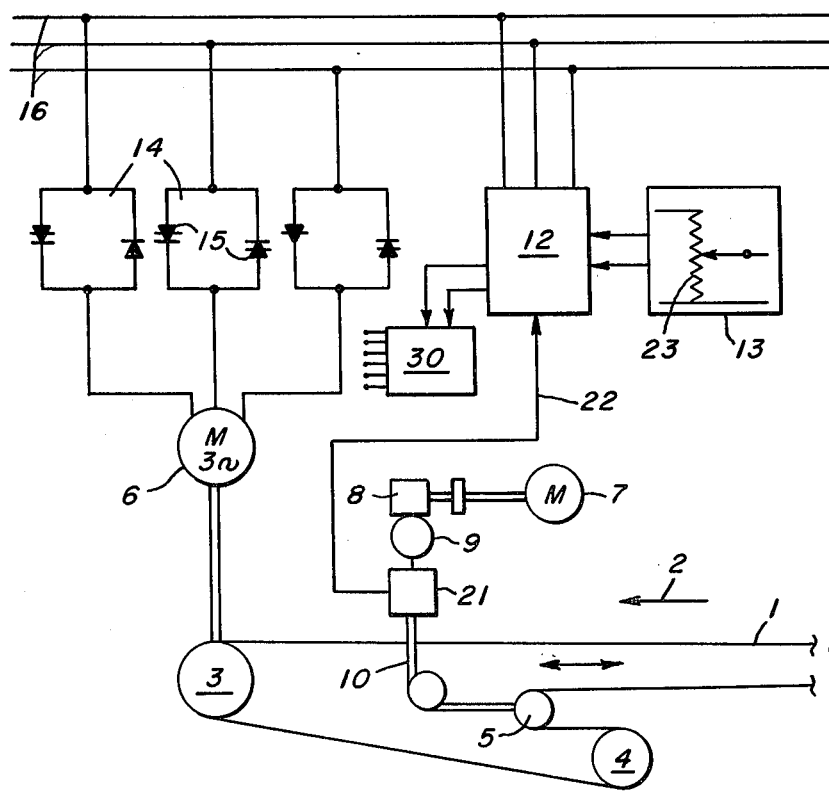
FIG. 2 illustrates a second form of control system for the belt conveyor shown in FIG. 1. In this second form, a particular belt tension is selected as an operating parameter for the control system.

FIGS. 1 and 2 illustrates the same form of an endless belt conveyor which includes an endless belt 1 adapted to move in the direction of the arrow 2. The belt is trained about a driven guide drum 3 from where the belt passes around a guide drum 4 and thence about a tension drum 5 from where the belt passes in an endless fashion about a guide drum 3A. A three-phase motor 6 has its output shaft operatively coupled in the well-known manner to the drum 3. It is preferred, although not shown in the drawings, to provide a gear-type speed reducer in the drive train between the shaft of the motor 6 and the drive input shaft for the drum 3. A motor-driven tensioning apparatus is connected to the tension drum 5 to provide a constant tension in the conveyor belt. The tensioning apparatus is made up of a tensioning motor 7, preferably a stepping-type motor, connected through a worm gear drive 8 to a rope drum 9 having a rope 10 secured to the tension roller 5.

In the embodiment according to FIG. 2, the belt tensioning device further includes a tension load sensor 21 connected at one side to the rope 10 and connected at its other side to an additional length of rope 10 which is wrapped around the drum 9.

In both embodiments of the control system illustrated in FIGS. 1 and 2, a regulator circuit 12 is provided to control the drive motor 6 during acceleration and deceleration of the conveyor belt in a manner to limit the development of conveyor belt tension stress to a value corresponding to a predetermined desired tensioning value. The regulator circuit 12 operates on the basis of developing an error signal corresponding to the difference between electrical signals, one of which represents the actual tensioning of the conveyor belt during acceleration and deceleration and the other signal represents a desired tensioning of the conveyor belt during such acceleration and deceleration. A current regulator 14 is coupled in each of three-phase power supply lines 16 for the motor 6. Each of the current regulators consists of a pair of thyristors 15 arranged back-to-back to operate in parallel opposition. The thyristors are triggered by a pulsing transformer system forming a firing circuit 30, thereby controlling the passage of current from the three-phase current supply lines 16 to the motor 6. The pulsed firing of the thyristors produces a chopped or pulsed current whereby a larger or shorter time interval occurs between the end of the last voltage half-wave and the beginning of the following voltage half-wave. The three-phase current is chopped at the individual voltage half-waves, thereby reducing the effective voltage. Alternatively, the output voltage from the current regulators 14 may be controlled to pulse the current several times within one and the same voltage half-wave, thereby changing the current transmitting ability of the thyristors and consequently chopping the voltage time interval of the half-wave into several time intervals. The current regulators 14, controlled by firing circuit 30 for three-phase current, make it possible to control the frequency and also the amplitude of the voltage applied to the three-phase motor 6 and thereby simultaneously change its rotational speed and torque to the specific required value.

FIG. 1 illustrates a control circuit for controlling the drive motor 6 for uniform acceleration and deceleration through the use of an electrical signal delivered to the regulator circuit 12 from a tachometer generator 11 which is directly coupled to the motor 6. The signal produced is continuous throughout the starting and stopping operations of the conveyor system and corresponds to the actual speed of the motor, therefore also the conveyor belt. The regulator circuit 12 also receives a signal corresponding to the required speed of the conveyor belt throughout the period of acceleration and deceleration. The regulator circuit compares the two signals received and produces an error signal in line 12A which is proportional to the difference between the two input signals. Line 12A is connected to the firing circuit 30 for the thyristors. Constant acceleration and deceleration of the conveyor belt require a linearly changing value to the signal representing the required speed which is produced by a potentiometer 17. A movable tap 18 of the potentiometer is connected to a voltage source, not shown in FIG. 1. The movable tap 18 is moved at a constant velocity in the direction of the arrow 20 by a motor 19 during each period of acceleration and deceleration. Based on the direction in which the movable tap is moved, there is produced a linearly increasing or decreasing voltage which is used as a control parameter to represent the required speed at any given instant for the rotational speed of the drive motor 6, thus controlling the torque.

The motor 19 can be controlled to displace the movable tap 18 at any desired adjustable speed using a stepless adjustable reduction gear coupled between the motor and the movable tap. In this manner, the output signal from the potentiometer will compensate for parameters of the conveying system including dimensions, slope and other features by a linearly rising or falling of the required speed signal delivered to the regulator circuit 12.

Figure 3:
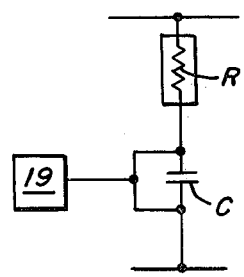
FIG. 3 illustrates a modified form of control apparatus for the control system shown in FIG. 1.

FIG. 3 illustrates an alternative control circuit for the motor 19 for displacement of the movable tap 18. As illustrated, the circuit is connected in series with the motor 19 and produces an integration to the rotational speed of the motor and thereby increasing or decreasing its speed. This, in turn, produces a similar integration to the required speed signal. The voltage applied to the terminals of motor 19 is increased or decreased by an RC circuit consisting of an adjustable resistor R and a capacitor C. The serial connection between the resistor and capacitor produces a time base current differential which is an integrating function to the rotation speed of the motor 19.

The control circuit according to FIG. 1, enables the rotational speed and hence the torque of the drive motor 6 to be adjusted to a specified limit during the starting and braking periods with a precise acceleration or deceleration of the conveyor belt. As indicated previously, this manner of controlling the drive motor for a belt conveyor installation is particularly useful where conveyor belts of different lengths are arranged sequentially one after the other. These features of the present invention bring about other advantages, particularly, for example, the use of smaller brakes for such conveyors since the drive motors actually perform the braking operation. The brakes are only needed to hold the conveyor belt after it has stopped.

FIG. 2 illustrates a control system for belt conveyors using actual belt tension as a control basis. An electrical signal is produced in line 22 by the load sensor 21 which is proportional to the instantaneous tension in the conveyor belt during acceleration and deceleration. The signal in line 22 is delivered to the regulator circuit 12 where it is compared with a required belt tension signal to produce an error signal corresponding to the difference between these signals for controlling the drive motor 6 using the thyristor firing circuit 30. The required tension signal is produced by a potentiometer 23 which is adjusted so that its output signal is proportional to the maximum tension stress to be permitted in the conveyor belt. The required tension signal is maintained constant throughout the acceleration and deceleration of the conveyor.

When belt conveyors are installed with a downwardly extending feed direction, the braking action on the belt to decelerate it in each of the described forms of control system can be effected, for example, by reversing the motor field. The drive motor then acts as a generator which is driven by the downwardly sloping conveyor belt. The motor decelerates the conveyor belt until it comes to rest and then a brake is energized to hold the belt. By employing the control system according to the present invention for starting and stopping a conveyor belt, it is no longer necessary to install special machines and start-up couplings for the conveyors. The starting and braking operations are controlled and timed in such a manner that an inadmissible belt tension and excessive load demands upon the power supply do not occur during the conveyor operation.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. The combination with an endless conveyor belt trained about a guide drum, said conveyor belt transporting a relatively heavy burden that changes from time-to-time whereby stresses are developed in the conveyor belt endangering it to probable tearing and similar destruction essentially only during periods of starting and stopping, a drive motor supplied with a multi-phase alternating current for rotating said guide drum to drive said conveyor belt, a tension drum contacting said conveyor belt, and position control means connected to said tension drum for developing a predetermined required tension upon said conveyor belt; of a control system to avoid tearing and similar destruction only during starting and stopping the conveyor belt while loaded with a relatively heavy burden by said drive motor, said control system comprising:

means for producing an electrical signal corresponding to a desired tensioning of said conveyor belt during starting acceleration and stopping deceleration by said drive motor, means for producing an electrical signal to represent the actual tensioning of said conveyor belt during starting acceleration and stopping deceleration by said drive motor, regulator means for producing an error signal corresponding to the difference between said electrical signals, said regulator means controlling said drive motor in response to said error signal during acceleration and deceleration to limit the developing conveyor belt tension not to exceed a value corresponding to said desired tension, thyristors coupled in each phase of the multi-phase alternating current power supply lines for said drive motor, and a firing circuit responsive to the error signal produced by said regulator means for firing said thyristors.

2. The combination according to claim 1 wherein said means for producing an electrical signal to represent the actual tensioning of said conveyor belt comprises a pressure sensor coupled between said tension drum and said position control means.

3. The combination according to claim 2 wherein said means for producing an electrical signal corresponding to a desired tensioning of said conveyor belt comprises an adjustable potentiometer for providing an electrical signal having a constant value corresponding to said desired tensioning of said conveyor belt by said tensioning drum.

4. The combination according to claim 1 wherein said means for producing an electrical signal corresponding to a desired tensioning of said conveyor belt comprises a potentiometer including a movable tap, and drive means coupled to said movable tap for continuously changing the electrical signal representing said desired tensioning during acceleration and deceleration of said conveyor belt.

5. The combination according to claim 4 wherein said means for producing an electrical signal to represent the actual tension of said conveyor belt comprises a tachometer driven by said drive motor.

6. The combination according to claim 4 further comprising an integration circuit connected in series with current supply lines for said drive means coupled to said movable tap.

7. The combination according to claim 6 wherein said integration circuit includes a variable resistor connected in series with a capacitor.

\* \* \* \* \*